United States Patent [19]
Lodovico

[11] Patent Number: 5,215,265
[45] Date of Patent: Jun. 1, 1993

[54] GLASS BOTTLE BREAKING APPARATUS

[75] Inventor: Frank J. Lodovico, Delmont, Pa.

[73] Assignee: Allegheny Paper Shredders, Inc., Delmont, Pa.

[21] Appl. No.: 877,818

[22] Filed: May 4, 1992

[51] Int. Cl.$^5$ ............................................ B02C 18/28
[52] U.S. Cl. .................................... 241/99; 241/158; 241/236
[58] Field of Search ................. 241/99, 157, 158, 236

[56] References Cited

U.S. PATENT DOCUMENTS

| | | | |
|---|---|---|---|
| 697,311 | 4/1902 | Acklin | 241/236 |
| 1,181,660 | 5/1916 | Gensheimer . | |
| 1,598,364 | 8/1926 | Cassell et al. . | |
| 1,893,030 | 1/1933 | Kingsley | 241/99 |
| 2,919,075 | 12/1959 | Pfeiffer | 241/160 |
| 3,010,665 | 11/1961 | Smith | 241/99 |
| 3,151,814 | 10/1964 | Morgan et al. | 241/99 |
| 3,489,354 | 1/1970 | Harper et al. | 241/36 |
| 3,504,621 | 4/1970 | Qualheim | 100/96 |
| 3,749,004 | 7/1973 | Pagdin et al. | 100/50 |
| 3,951,059 | 4/1976 | Morris | 100/173 |
| 4,573,641 | 3/1986 | DeWoolfson et al. | 241/36 |
| 4,826,796 | 9/1989 | Lodovico et al. | 100/173 |
| 4,953,795 | 9/1990 | Bielagus | 241/159 |

FOREIGN PATENT DOCUMENTS

| | | | |
|---|---|---|---|
| 248198 | 12/1987 | European Pat. Off. . | |
| 3723038 | 1/1989 | Fed. Rep. of Germany | 241/99 |
| 3829380 | 3/1990 | Fed. Rep. of Germany . | |

Primary Examiner—Mark Rosenbaum
Assistant Examiner—John M. Husar
Attorney, Agent, or Firm—James L. Sherman

[57] ABSTRACT

An improved glass breaking apparatus is of the type which includes a plurality of rotating breaking bars which are capable of breaking a glass bottle into small glass pieces and at least some larger glass pieces having a longest dimension exceeding a predetermined length. The improvement includes a pair of cylindrical rollers disposed below the plurality of rotating breaking bars and mounted for rotation in opposite directions about parallel, horizontal axes. The cylindrical rollers are spaced apart to provide a predetermined separation distance between the cylindrical outer surfaces thereof. The cylindrical rollers include an array of extensions about the cylindrical outer surface and are relatively disposed to cause the extensions of one cylindrical roller to be aligned with the cylindrical outer surface of the other cylindrical roller. Consequently, the extensions and the cylindrical outer surface of one cylindrical roller cooperate with the extensions and the cylindrical outer surface of the other cylindrical roller to break the larger glass pieces therebetween to reduce them into small glass pieces with a longest dimension which is less than the predetermined length.

6 Claims, 3 Drawing Sheets

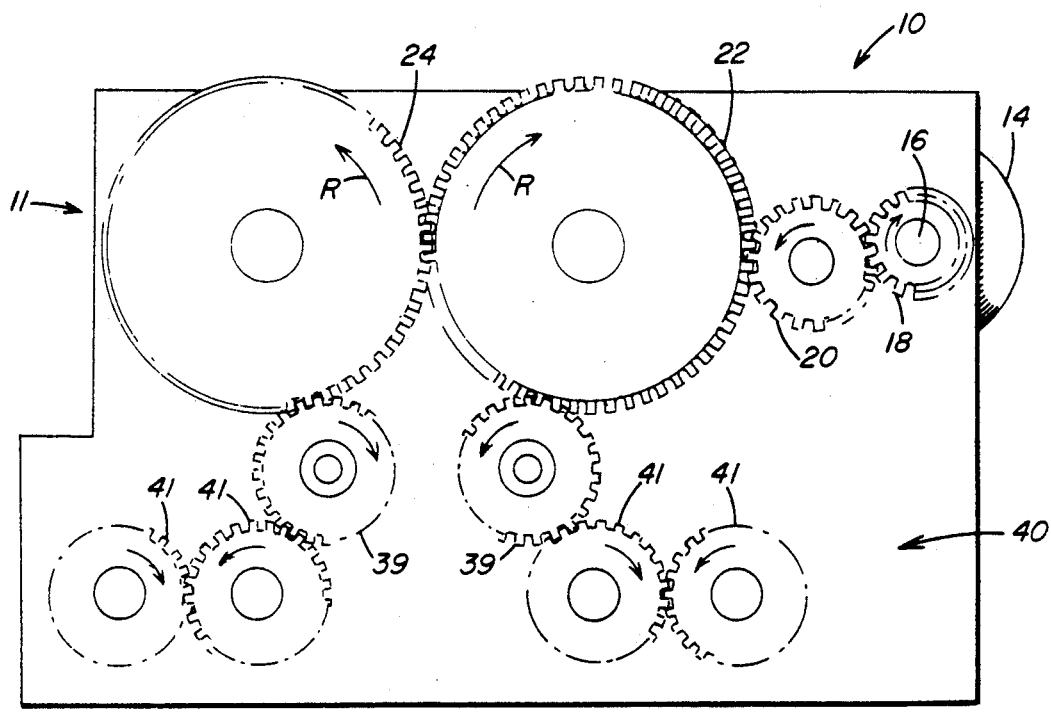
FIG. 3
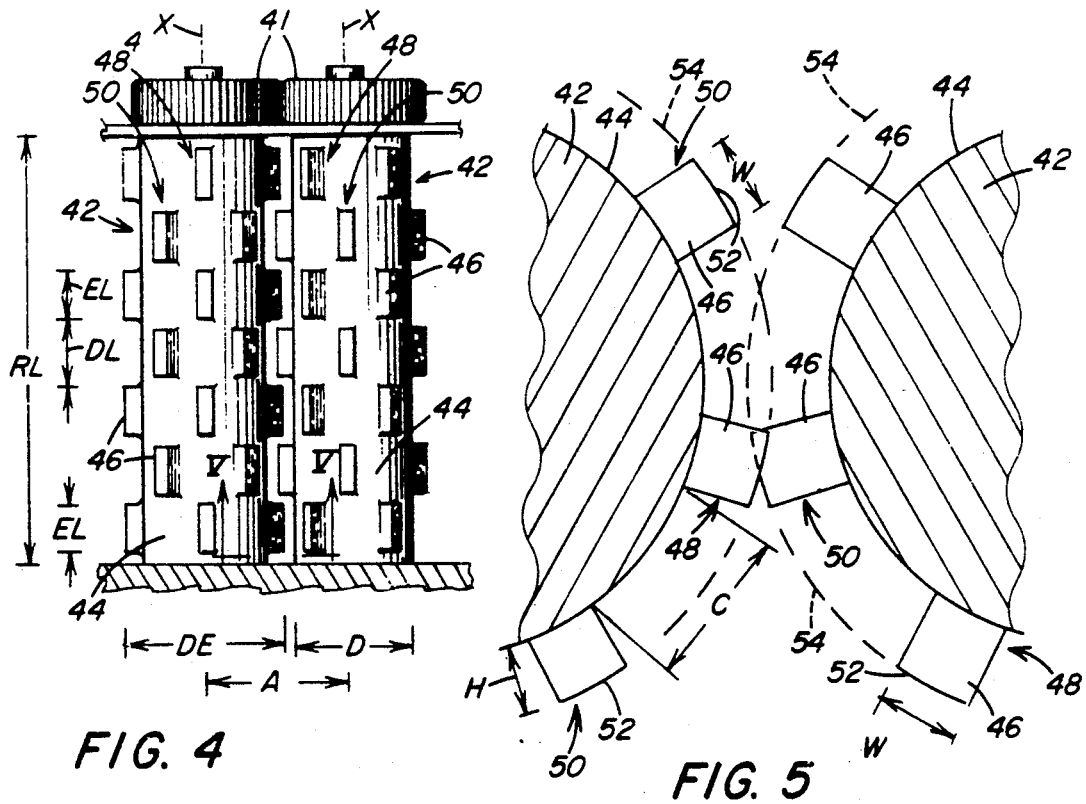
FIG. 4
FIG. 5

GLASS BOTTLE BREAKING APPARATUS

BACKGROUND OF THE INVENTION

1. Field of Invention

This invention relates to a glass breaking apparatus and, more specifically, to such a glass breaking apparatus which is capable of breaking large pieces of glass bottles or the like into smaller pieces for further disposition.

2. Description of the Prior Art

With increasing emphasis in recent years on energy conservation and environmental preservation, the collection and recycling of empty glass bottles has become an important factor in the conservation and preservation effort. The recycling of glass bottles has helped to reduce the presence of broken glass bottles strewn throughout and has lessened the energy requirement by the recycling of empty glass bottles for future use. Numerous states and localities have adopted glass conservation programs that require the recycling of glass bottles.

Unfortunately, the lack of an efficient and economical system to recover and reuse glass bottles has largely caused a tremendous waste of recoverable bottles, since currently it is often easier and more economical, in the short term, to discard the bottles, instead of recycling them. Additionally, the recycling of bottles poses numerous problems in ascertaining whether a particular bottle is refundable; sorting refundable bottles by brand and color; and determining the value of the refund to be given by the store to the customer. Often, stores must either hire extra employees for these particular time consuming tasks or allow customers to return the bottles on an honor system, in which the customer is trusted to report the correct amount of the bottles he has returned.

U.S. Pat. No. 4,573,641, entitled Glass Bottle Collection And Crushing Apparatus by Bruce H. DeWoolffson et al. and patented on Mar. 4, 1986, includes a reverse vending machine for the unit recovery of empty glass bottles. The apparatus is quick and convenient to use and will save substantial time and expense on the part of the retailer to provide refunds for the refundable bottles to the customers. Due to this increased ease in usage and decrease in operational cost, the reverse vending machine allows for the attainment of environmental and energy conservation goals in an efficient and economical manner.

The reverse vending machine preselects only those bottles that are refundable prior to accepting the offered bottle into the machine. Unacceptable and non-refundable bottles are recognized by the apparatus and not processed further. Once accepted, the refundable bottle is separated by color and crushed for easy storage. The reverse vending machine eliminates a need for having a store or retailer use employees to identify and sort the refundable bottles and give refunds to the customers. Rather, the reverse vending machine automates these previously manually performed tasks so that the customer, unaided, can return and receive a refund for glass bottles.

Additionally, the reverse vending machine retains a count of the different kinds of bottles it has received and, therefore, it can provide a detailed description of the types or brands of bottles returned to the store. The refunded bottles are separated by color, crushed, and stored in the reverse vending machine to make it easy for the glass of the bottles to be recovered for recycling. By crushing the returned bottles, the reverse vending machine lessens the space requirements that the store must allocate for handling the returned bottles and, thereby, allows stores to use this valuable space for other more economical uses.

The reverse vending machine includes accepting means having two panels which together form a V-shaped base portion of the bottle access area. The accepting means further includes opening means such as a solenoid and latch mechanism, associated with each panel for tilting the associating panel inwardly toward the crushing means disposed therebelow to allow a bottle, placed on the base portion to fall, inwardly to the crushing means. Depending on the color of the bottle, the preselection means activates the proper one of the solenoid and latch mechanism to cause the attached panel to tilt inwardly, thereby allowing the bottle to fall by gravity into the crushing means.

In the reverse vending machine disclosed in U.S. Pat. No. 4,573,641, the crushing means includes a plurality of rotating breaking bars positioned beneath each panel to receive the refundable bottles deposited by the accepting means and to crush the received bottle into glass cullet. Preferably, each crushing means includes a horizontal shaft, which extends between the front and back walls of the crushing means housing, and a plurality of breaking bars outwardly extending from the horizontal shaft. The breaking bars are rotated by a drive mechanism which is actuated by the preselection means. The storage means can include a collection hopper positioned below each of the crushing means so that the glass crushed by that particular crushing means will fall by gravity into its particular hopper.

While the machine described hereinabove has satisfactorily collected, sorted and crushed glass bottles in an appropriate manner for collection in a container below the crushing means, a change in the collection process and method has resulted in the recognition of some problems. Specifically, the preferred improved apparatus for reducing, collecting and storing of the glass bottles includes a vacuum or suction means disposed below the apparatus for the removal of the pieces of glass bottles for disposition and collection at a remote location. It has been found that for proper suctioning or vacuuming of such pieces of glass, the size of the pieces is critical. While the configuration described hereinabove does reduce the glass bottles to many pieces, some of the pieces are relatively large and are not easily transported through the vacuum or suction means. The rotating breaking bars result in a significant number of relatively large pieces and the apparatus, therefore, needs some means for further reducing these large pieces to insure that they are sufficiently small for movement through the vacuum or suction means.

It should be noted that a basic glass breaking machine similar to that included in the apparatus of U.S. Pat. No. 4,573,641, is disclosed in U.S. Pat. No. 3,151,814. However, the configuration employed in U.S. Pat. No. 3,151,814 would also be incapable of assuring that the glass bottles broken thereby would include pieces of glass which are sufficiently small for transportation by the vacuum or suction means.

U.S. Pat. No. 3,010,665 discloses a crushing apparatus which might be employed to further reduce the size of the pieces of glass. However, any attempt to directly crush glass in a chamber such as disclosed therein would be complicated and would not be particularly adaptable for use with the crushing means of the apparatus of U.S. Pat. No. 4,573,641.

Accordingly, the improved apparatus for reducing empty glass bottles and the collecting of the glass pieces should include means which will insure the further reduction of the pieces of glass to facilitate their transportation through the vacuum or suction means. Accordingly, a review of various prior art devices which might be employed for this purpose and which proport to crush containers or break up glass containers should be considered.

U.S. Pat. No. 3,489,354 discloses a mechanism for crushing, breaking and fragmenting expendable frangible or metallic receptacles or containers to reduce the same to rubble requiring a minimum of temporary storage space prior to ultimate disposition. However, there is no assurance of the size of the pieces of glass bottles broken thereby. For example, the series of rollers disposed therein include blades which are intended to cooperate to reduce the glass bottles to pieces of glass. However, the cooperation of such blades does not prevent the formation of relatively large pieces which may be disposed axially, generally parallel with the rollers, for undisturbed passage therebetween. This limitation is understandable when it is recognized that the device of U.S. Pat. No. 3,489,354 is also adapted for the flattening of metal cans and the like. Similarly, U.S. Pat. No. 3,504,621 is primarily configured for the crushing of metal cans or the like. The device disclosed in U.S. Pat. No. 3,504,621 includes long, longitudinally disposed bars which extend at a significant height above the basic cylindrical surface of the rollers therein. Such longitudinally disposed bars having the relatively large height above the cylindrical surface of the roller would not prevent large pieces of glass from collecting longitudinally along the cylindrical outer surface of the roller as a glass bottle or the like is reduced thereby.

A number of devices employ crushing rollers which might, when first considered, include configurations which could cooperate with the crushing wheels of the device of U.S. Pat. No. 4,573,641 to insure the reduction of the glass bottles to sufficiently small pieces for suctioning or vacuuming for disposition at a remote location. However, it has been found that simply reducing the glass bottles to the smallest possible pieces will not necessarily facilitate vacuuming and suctioning to a remote location. For example, while it is preferable to reduce the glass bottles to small pieces, it is not desirable to crush or pulverize the glass to produce fine granular particles. Such fine, granular particles are relatively difficult to transport through the vacuum or suction means, it has also been found that such fine particles are generally undesirable for transportation and have not been acceptable for some glass recycling processes. Some facilities in the glass recycling business clearly prefer small, discrete pieces of glass rather than any fine, pulverized pieces which could occur without proper means being employed for reducing the glass to such small pieces.

U.S. Pat. Nos. 1,181,660 and 1,598,364 include crushing rollers having complicated pointed spikes which are threaded to the cylindrical surface of the rollers. Similarly, U.S. Pat. No. 697,311 includes an array of oddly shaped spikes which provides no space between the extended end thereof and the cylindrical surface of the adjacent roller. As a result, there is no assurance that the spiked rollers of these three prior art devices are particularly adapted to prevent the formation of fine, granular particles of glass when larger pieces of glass are broken thereby. On the other hand, U.S. Pat. No. 2,919,075 includes a simplified spike configuration but, with the utilization of only one cylinder, there is no assurance that larger pieces of glass will be further reduced thereby.

Similarly, while the apparatus for crushing cans disclosed in U.S. Pat. No. 4,826,796 includes a simplified array of extensions on the cylindrical surfaces of the rollers thereof, there is no assurance that such extensions on the rollers will properly reduce the relatively large pieces of glass bottles directed thereto. Specifically, the relative dimensions of the extensions and the relative disposition of such extensions is such that large pieces of glass could be disposed longitudinally between the extensions to simply pass between the rollers without proper reduction to the smaller pieces of glass.

U.S. Pat. No. 1,893,030 would appear to accommodate many types of glass but includes movable, impact rollers which are very complicated and would appear to be quite expensive to provide and maintain. A number of other devices, including those disclosed in U.S. Pat. Nos. 3,749,004 and 3,951,059, employ complicated crushing configurations which are clearly not adaptable for use within the reverse vending machine of the type described hereinabove. Specifically, U.S. Pat. No. 3,749,004 includes rollers which move in opposite directions and appear to require a resilient mounting means for the passage of material therethrough. Additionally, U.S. Pat. No. 3,951,059 discloses a series of reducing rollers which can be selectively axially separated but basically include a configuration which would cause glass passing therethrough to be reduced to fine, granular particles in a manner which is undesirable for further disposition and recycling.

European Patent No. 248,198 and Offenlegungsschrift No. 3,829,380 disclose complicated processes for the reduction of material deposited therein. These processes are clearly not adaptable for use in a reverse vending machine of the type generally disclosed in U.S. Pat. No. 4,573,641.

Accordingly, there remains a need for providing a means within such a reverse vending machine which is capable of further reducing larger pieces of glass produced by the crushing means thereof into acceptable smaller pieces for vacuuming and suctioning to a remote location. The preferred reducing means should not produce fine, granular pieces of glass which may not be generally acceptable for further processing at some recycling facilities.

SUMMARY OF INVENTION

It is an object of the present invention to provide an improved apparatus for reducing the glass bottles which are collected in a reverse vending machine.

It is another object to provide such an improved apparatus which will insure that the pieces reduced therein are of an appropriate size for vacuuming or suctioning to a remote location.

It is yet another object of invention to provide such an improved apparatus which will minimize the production of fine, granular particles of glass which may be difficult to transport and may be undesired for the further processing of the glass at some recycling facilities.

These and other objects of the invention are provided in a preferred embodiment thereof including an improved glass breaking apparatus of the type which includes a plurality of rotating breaking bars. The plurality of rotating breaking bars is capable of breaking a glass bottle having a basic predetermined wall thickness into small glass pieces and at least some larger glass pieces. The small glass pieces have a longest dimension which is less than a predetermined length. The larger glass pieces have a longest dimension which is at least the predetermined length. The improvement includes a pair of cylindrical rollers disposed below the plurality of rotating breaking bars. The pair of cylindrical rollers are mounted for rotation in opposite directions about parallel horizontal axes thereof. The parallel horizontal axes have a predetermined distance therebetween. Each of the cylindrical rollers has a roller diameter to define a cylindrical outer surface of the cylindrical roller. The cylindrical outer surfaces of the pair of cylindrical rollers have a predetermined separation distance therebetween. Each cylindrical roller has an array of extensions about the cylindrical outer surface. Each extension has a predetermined height from the cylindrical outer surface. The pair of cylindrical rollers are relatively disposed about the horizontal axes to cause each extension on one of the cylindrical rollers to be aligned with the cylindrical outer surface on the other of the cylindrical rollers as the extensions on the one cylindrical roller are circumferentially and axially disposed between the extensions on the other cylindrical roller when each extension is generally located between the horizontal axes during rotation of the cylindrical rollers. Each extension on the one cylindrical roller is at a predetermined minimum gap distance from the cylindrical outer surface of the other cylindrical roller when each extension is located between the horizontal axes. The predetermined minimum gap distance is greater than the predetermined wall thickness of the small glass pieces and the larger glass pieces. The extensions and the cylindrical outer surface of the one cylindrical roller cooperating with the extensions and the cylindrical outer surface of the other cylindrical roller to break the larger glass pieces therebetween to reduce the larger glass pieces with a longest dimension which is at least the predetermined length into small glass pieces with a longest dimension which is less than the predetermined length.

The improved glass breaking apparatus can include each cylindrical roller having a predetermined roller length, the array of extensions on each cylindrical roller including a plurality of longitudinal rows of extensions, and the longitudinal rows being evenly disbursed about a circumference of the cylindrical roller. Each extension in each of the longitudinal rows has a longitudinal length and is longitudinal separated from adjacent extensions in the longitudinal row by a longitudinal separation distance which is greater than the longitudinal length. Each extension has a circumferential width, the longitudinal rows of extensions have a circumferential space therebetween, and the circumferential space is between the circumferential width and about three times the circumferential width. The preferred improved glass breaking apparatus includes at least eight of the longitudinal rows of extensions.

The preferred improved glass breaking apparatus includes each extension with a curved outer surface. The curved outer surface of each extension preferably lies within an extended cylindrical surface. The extended cylindrical surface has an extension diameter equal to the roller diameter plus twice the predetermined height of each extension.

The improved glass breaking apparatus may also include the predetermined height which is between 0.1 and 0.15 of the roller diameter. The predetermined length of glass pieces is about three-fourths of the roller diameter and about six times the predetermined height.

BRIEF DESCRIPTION OF THE DRAWINGS

FIG. 3 is a rear elevational view of the improved glass breaking apparatus including additional features of the invention.

FIG. 4 is a top view of the preferred cylindrical rollers as seen along line IV—IV of FIG. 2.

FIG. 5 is an enlarged, fragmentary view, partially in section, of the preferred cylindrical rollers as seen along line V—V of FIG. 4.

DETAILED DESCRIPTION OF A PREFERRED EMBODIMENT

As generally seen in FIGS. 1, 2, 3, 4 and 5 the improved glass bottle breaking apparatus 10 incorporates a pair of the rotating breaking bar configurations 12 presently being employed in reverse vending machines of the type disclosed in U.S. Pat. No. 4,573,641. U.S. Pat. No. 4,573,641 is incorporated by reference as if it is included in its entirety herein. However, the description provided hereinbelow is directed to only those portions of the apparatus disclosed in U.S. Pat. No. 4,573,641 which are pertinent to the improved apparatus of the present invention. For example, the configuration shown throughout the figures is generally adapted for including two horizontally adjacent glass breaking configurations for accommodating the glass bottles of different color in the selective manner as discussed in U.S. Pat. No. 4,573,641. Clearly, the selection, sorting, and directing of the bottles to the respective adjacent glass breaking apparatus is outside the scope of the present invention. Accordingly, the present invention assumes that the proper bottles will be directed to either one of the adjacent breaking bar configurations 12 for further direction to respective containers (not shown) therebelow.

Figure 1:
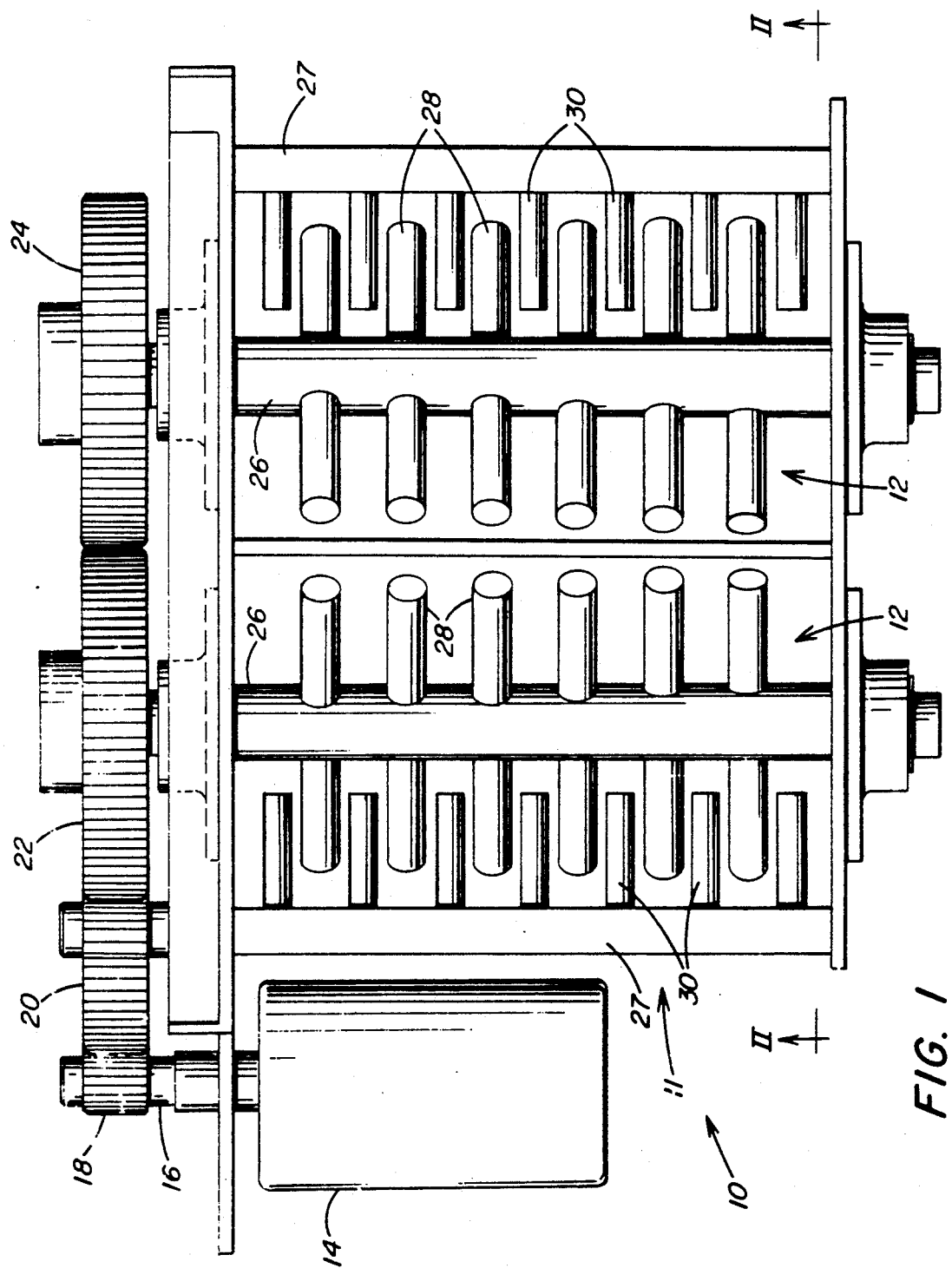
FIG. 1 is a top view of the improved glass breaking apparatus which view only shows the breaking bar configuration without showing additional features of the present invention.

As seen in FIG. 1, the prior art rotating breaking bar configurations 12, which are employed in a first breaking stage 11 of the apparatus 10, are powered by a drive motor 14. The motor 14 includes an output shaft 16 having a drive gear 18 mounted thereon. The drive gear 18 is in engagement with an idler gear 20 which, in turn, engages a first driven gear 22 associated with one of the rotating breaking bar configurations 12. The first driven gear 22 operatively engages a second driven gear 24 which is associated with the second rotating breaking bar configuration 12.

The configuration of gears 18, 20, 22, 24 produces rotation of each shaft 26 in each breaking bar configuration 12. The shafts 26 of the rotating breaking bar configuration 12 are mounted for comparable rotation in opposite directions in each half of the first breaking stage 11 for respective receipt of the appropriate glass bottles therein. The rotation of the shafts 26 is such that a plurality of breaking bars 28 mounted thereon are caused to rotate upwardly in the middle of the first breaking stage 11 and downwardly at the outer side walls 27 thereof. Each of the shafts 26 includes two arrays of breaking bars 28 extending outwardly therefrom. A first array of parallel breaking bars 28 is on one side of the shaft 26 while a second, generally parallel array of breaking bars 28 is disposed to extend outwardly from the other side of the shaft 26. The two arrays of breaking bars 28, rotating in the same direction with the shaft 26, provide at least two opportunities to break the glass on each revolution of the shaft 26.

More specifically, as a glass bottle 13 is directed to either of the rotating breaking bar configurations 12, the bottle 13 is rotated as indicated by the arrows R from the central region 25 of the first breaking stage 11, above the shaft 26, and toward the outer side wall 27 of the first breaking stage 11. The outer side wall 27 of the first breaking stage 11 includes an array of fixed, parallel breaking bars 30 extending inwardly therefrom toward the shaft 26. The rotating breaking bars 28 are disposed along the shaft 26 so that each of the breaking bars 28 will pass between an adjacent pair of the fixed breaking bars 30.

Generally, the first breaking stage 11 includes a first stage distance F between the shaft 26 and the outer side wall 27 so that large pieces PL of glass having a longest dimension of at least a predetermined length L approaching the first stage distance F could clearly pass between the adjacent fixed bars 30 and rotating breaking bars 28. Of course, even larger pieces PL, having a maximum length exceeding the first stage distance F, could be directed below the rotating breaking bar configurations 12 by such larger pieces PL being oriented longitudinally to extend downwardly between the bars 28, 30, as generally seen at 31 in FIG. 2.

Clearly, the initial breaking of the glass bottles 13 in the first breaking stage 11 will not result in all of the pieces formed thereby having such a large dimension or orientation that they will barely pass between the relatively large first stage distance F between the shaft 26 and the outer side wall 27 and the rotating breaking bars 28 and the fixed breaking bars 30. In any case, operation of the rotating breaking bar configuration 12 has resulted in the reduction of the glass bottles primarily into smaller glass pieces PS which have a longest dimension which is less than the predetermined length L while the remaining larger glass pieces PL have a longest dimension which is the predetermined length L or greater.

Generally, the initial value or significance of the predetermined length L is determined by the operational limits of the means for collecting and transporting the glass pieces to a remote location (not shown) through the suction or vacuum system. It has been found that pieces having a longest dimension exceeding the predetermined length L could interfere with or prevent proper transportation of the pieces to the remote location for collection and eventual disposition. With the predetermined length L being less than the first stage distance F between the shaft 26 and the outer side wall 27, the first breaking stage 11 produces a sufficient number of the larger glass pieces PL which could interfere with the desired transportation thereof.

Figure 2:
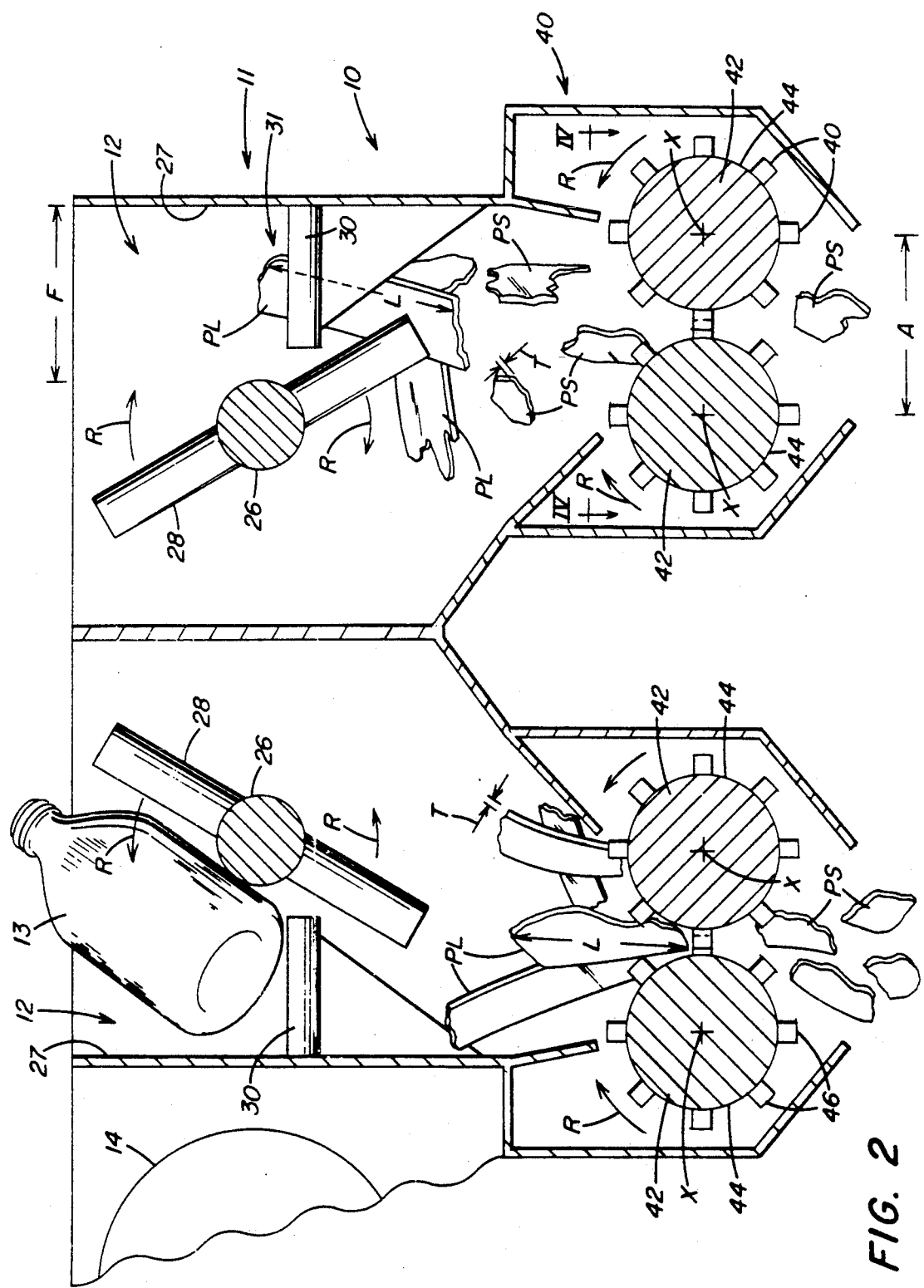
FIG. 2 is a view of the preferred glass breaking apparatus, partially in section, including the breaking bar configuration of FIG. 1 and the preferred pair of cylindrical rollers of the present invention for further reducing the size of the glass pieces, as would be seen along line II—II of FIG. 1.

As seen in FIG. 2, the preferred glass bottle breaking apparatus 10 includes a second breaking stage 40 for further reducing the larger glass pieces PL into the desired small glass pieces PS. Specifically, the second breaking stage 40 includes a pair of cylindrical rollers 42 which are disposed below each of the rotating breaking bar configurations 12. The pair of cylindrical rollers 42 are mounted for rotation about parallel horizontal axes X in opposite directions, as indicated by the arrows R. The parallel horizontal axes X have a predetermined distance A therebetween.

As seen in FIG. 3, in order to produce rotation of the cylindrical rollers 42, each half of the improved apparatus 10 includes another idler gear 39 which is in engagement with its respective first driven gear 22 and second driven gear 24. The second idler gear 39 engages a first driven gear 41 which is on the end of one of the cylindrical rollers 42 and, in turn, drives a second driven gear 41 on the end of the other cylindrical roller 42. As a result, the desired equal but opposite rotation R for the pair of cylindrical rollers 42 for each half of the second breaking stage 40 are produced.

Each of the cylindrical rollers 42 has a predetermined roller diameter D to define a cylindrical outer surface 44 of the cylindrical roller 42. The cylindrical outer surfaces 44 of the pair of cylindrical rollers 42 have a predetermined separation distance S therebetween.

Each of the cylindrical rollers 42 includes an array of extensions 46 about the cylindrical outer surface 44. Each of the extensions 46 has a predetermined height H from the cylindrical outer surface 44. The pair of cylindrical rollers 42 are relatively disposed about the horizontal axes X to cause each extension 46 on one of the cylindrical rollers 42 to be aligned with the cylindrical outer surface 44 on the other of the cylindrical rollers 42 when the respective extensions 46 are generally located between the horizontal axes during rotation of the cylindrical rollers 42. This general alignment of the extensions 46 with a corresponding portion of the cylindrical outer surface 44 on the adjacent cylindrical roller 42 is accomplished by the overall arrangement of the extensions 46 on each of the cylindrical rollers 42 so that the extensions on one cylindrical roller 42 are circumferentially and axially disposed between the extensions 46 on the other cylindrical roller 42 when each extension 46 is generally located between the horizontal axes X during rotation of the cylindrical rollers 42.

The preferred cylindrical rollers 42 include at least eight longitudinally disposed rows of such extensions 46. With each cylindrical roller 42 having an overall length RL, it is appropriate for the extensions 46 to include a predetermined longitudinal length EL of only a fraction of the roller length RL with adjacent extensions 46 within each row being longitudinally separated. The preferred longitudinal separation distance DL between each of the extensions 46 on a row is greater than the predetermined longitudinal length EL of the extensions 46.

Accordingly, in a preferred configuration for the cylindrical rollers 42, a first row 48 of such extensions 46 on the cylindrical outer surface 44 includes four of such extensions 46. An adjacent second row 50 of such extensions 46 on the cylindrical surface 44 of each cylindrical roller 42 includes only three of such extensions 46. Generally, the various extensions 46 on each row 48, 50 are longitudinally separated along the length RL of the cylindrical roller 42 to establish the desired longitudinal separation distance DL therebetween for each row 48, 50. Each cylindrical roller 42 has an arrangement of alternating first rows 48 and second rows 50 around the circumference of the cylindrical outer surface 44. Consequently, with proper orientation of the cylindrical rollers 42 during the rotation thereof, when the respective extensions 46 are located between the horizontal axes X, an extension 46 in the first row 48 on one of the cylindrical rollers 42 will be disposed between longitudinally aligned extensions 46 in the second row 50 on the other roller 42. Each such extension 46 will thus be located in alignment with the cylindrical surface 44 between adjacent extensions 46 on the other cylindrical roller 42 when the extensions 46 is disposed between the horizontal axes X of the cylindrical rollers 42. Similarly, when a second row 50 on the one cylindrical roller 42 is disposed between the horizontal axes X of the cylindrical rollers 42, the extensions 46 therein are disposed between the extensions 46 on a first row 48 of the other roller 42 to again be located in general alignment with the cylindrical surface 44 of the other roller 42.

As seen in FIG. 5, each of the extensions 46 includes a rounded extended end 52. Preferably, the rounded extended end 52 is provided by "turning" the cylindrical rollers 42 after the extensions 46 are provided thereon to cause each extended end 52 to lie within an extended cylindrical surface 54 having an extension diameter DE which is equal to the roller diameter D plus twice the height H of each extension 46.

Generally, it should be noted that the distance A between the horizontal axes X, the roller diameter D, the height H of the extensions 46 and the resulting extension diameter DE is such that there is a gap G between each extension 46 and the aligned portion of the cylindrical outer surface 44 of the other cylindrical roller 42. The gap G is greater than the predetermined wall thickness T of the glass bottles and the resultant small pieces and larger pieces broken therefrom. It has been found that if the gap G were less than the predetermined wall thickness T, the glass pieces would tend to be crushed between the cylindrical outer surface 44 and the extended end 52 of each extension 46. Crushing the glass in this manner produces very fine particles which are more difficult to transport by the suction or vacuum system discussed hereinabove. Additionally, some glass recycling facilities incorporate systems which do not desire or function as well when such fine glass particles are included.

The general provision of a rounded surface for the extended end 52 of each extension 46 has been found to further facilitate the breaking of the glass pieces thereby. With the improved apparatus 10 being configured for incorporation within an existing rotating breaking bar configuration, it is significant that the additional power requirements be kept to a minimum. By including the extended end 52 within the extended cylindrical surface 54, the overall operation and efficiency of the cylindrical rollers 42 is improved. More specifically, it has been found that the amount of force and energy required to break the glass pieces is more even and uniform than when such extensions 46 are provided a flat end and with right angled edges thereon.

The preferred apparatus 10 is capable of breaking glass bottles which are typically found in the soft drink industry and are configured to include about 16 ounces of such soft drink liquid. Such glass bottles are about 7 inches high, have a diameter of about 2-⅜ inches and a basic wall thickness T of about 0.1 inches. The preferred apparatus 10 is intended to insure that such bottles are reduced into small pieces which have no larger dimension which exceeds a predetermined length L of 2.25 inches.

The preferred apparatus 10 includes a two HP motor to produce rotation of the rotating breaking bar configurations of about 9.5 RPM. The cylindrical rollers are configured to rotate at a speed of about 21.5 RPM. The distance A between the horizontal axes in the preferred second breaking stage 40 is about 3.5 inches. Each of the cylindrical rollers 42 have a preferred diameter D of about 3 inches. The extensions 46 have a preferred height H of about 0.375 inches to define the extended cylindrical surface with an extension diameter DE of about 3.75 inches.

The circumferential width W of each of the preferred extensions 46 is about 0.375 inches. With the cylindrical rollers having eight longitudinal rows thereon, the circumferential space C between the longitudinal rows of extensions 46 is about 0.8044 inches. While the preferred cylindrical rollers include eight such rows, it should be understood that additional rows could alternatively be employed without departing from the scope of the invention as claimed. For example, if there were provided twelve rows of such extensions 46, which extensions include the same circumferential width W of about 3.75, the circumferential space C would be reduced to about 0.411. Accordingly, it should be recognized that the preferred ratio of the circumferential space C to the circumferential width W of each extension could range from about 1 to about 2.5.

The overall length RL of the preferred cylindrical rollers 42 is about 10.625 inches. With the rows 48, 50 of extensions 46 respectively including four and three extensions 46 thereon, the preferred extensions 46 have a longitudinal length EL of about 1.375 inches. The extensions 46 are separated one from the other on each row 48, 50 by a longitudinal separation distance DL of about 1.667 inches. With the longitudinal separation distance DL being greater than the longitudinal length EL, it is clear that the extensions 46 in the longitudinal rows 48, 50 will be received longitudinally between the extensions 46 in the respectively aligned other longitudinal rows 50, 48.

What is claimed is:

1. An improved glass breaking apparatus of the type which includes a plurality of rotating breaking bars; said plurality of said rotating breaking bars being capable of breaking a glass bottle having a basic wall thickness into small glass pieces and at least some larger glass pieces; said small glass pieces having a longest dimension which is less than a unacceptable length of glass; said at least some larger glass pieces having a longest dimension which is at least said unacceptable length of glass; said improvement comprising:

a pair of cylindrical rollers disposed below said plurality of said rotating breaking bars;

said pair of said cylindrical rollers being mounted for rotation in opposite directions about parallel horizontal axes thereof;

said parallel horizontal axes having an axis distance therebetween;

each of said cylindrical rollers having a roller diameter to define a cylindrical outer surface of said cylindrical roller;

said cylindrical outer surfaces of said pair of said cylindrical rollers having a separation distance therebetween;

said each cylindrical roller having an array of extensions about said cylindrical outer surface;

each of said extensions having an extension height from said cylindrical outer surface;

said extension height being between 0.1 and 0.15 of said roller diameter;

said pair of said cylindrical rollers being relatively disposed about said horizontal axes to cause said each extension on one of said cylindrical rollers to be aligned with said cylindrical outer surface on the other of said cylindrical rollers as said extensions on said one cylindrical roller are circumferentially and axially disposed between said extensions on said other cylindrical roller when said each extension is generally located between said horizontal axes during rotation of said cylindrical rollers;

said each extension on said one cylindrical roller being at a minimum gap distance from said cylindrical outer surface of said other cylindrical roller when said each extension is located between said horizontal axes;

said minimum gap distance being less than said extension height and greater than said basic wall thickness of said small glass pieces and said larger glass pieces;

said each cylindrical roller including a roller length;

said array of said extensions on said each cylindrical roller including a plurality of longitudinal rows of said extensions;

said longitudinal rows being evenly disbursed about a circumference of said each cylindrical roller;

said each extension in each of said longitudinal rows having a longitudinal length and being longitudinal separated from adjacent said extensions in said longitudinal row by a longitudinal separation distance which is greater than said longitudinal length;

said each extension having a circumferential width;

said longitudinal rows of said extensions having a circumferential space therebetween;

said circumferential space being between said circumferential width and about three times said circumferential width of said each extension; and said extensions and said cylindrical outer surface of said one cylindrical roller cooperating with said extensions and said cylindrical outer surface of said other cylindrical roller to break said larger glass pieces therebetween to reduce said larger glass pieces with said longest dimension which is at least said unacceptable length of glass into said small glass pieces with said longest dimension which is less than said unacceptable length of glass.

2. The improved glass breaking apparatus according to claim 1, wherein said plurality of said longitudinal rows includes at least eight of said longitudinal rows.

3. The improved glass breaking apparatus according to claim 1, wherein said each extension includes a curved outer surface.

4. The improved glass breaking apparatus according to claim 3, wherein said curved outer surface of said each extension lies within an extended cylindrical surface and said extended cylindrical surface has an extension diameter equal to said roller diameter plus twice said extension height of said each extension.

5. The improved glass breaking apparatus according to claim 1, wherein said unacceptable length of glass is about three-fourths of said roller diameter.

6. The improved glass breaking apparatus according to claim 1, wherein said unacceptable length of glass is about six times said extension height.

* * * * *